Patented Dec. 3, 1935

2,022,889

UNITED STATES PATENT OFFICE 2,022,889

METHOD OF DESULPHONATING DIAMINODIPHENYLAMINE-2-SULPHONIC ACID COMPOUNDS

Luther M. Lauer, Orchard Park, N. Y., assignor to National Aniline & Chemical Company, Inc., New York, N. Y., a corporation of New York No Drawing. Application February 9, 1935, Serial No. 5,857

11 Claims. (Cl. 260—128)

This invention relates to an improved method of preparing diaminodiphenylamine compounds. It relates more particularly to the manufacture of 4,4'-diaminodiphenylamine from 4,4'-diaminodiphenylamine-2-sulphonic acid.

It has hitherto been customary to prepare 4,4'-diaminodiphenylamine in accordance with two general methods: the first of these comprises the oxidation of a mixture of aniline and para-phenylene diamine to form indamine which is subsequently reduced to the desired product; and the second, which is the method used most generally for commercial purposes, comprises the reduction of 4,4'-dinitro or 4-nitro-4'-aminodiphenylamine or salts thereof in aqueous medium, the nitro groups being reduced to amino groups.

However, because both the intermediates and the products are insoluble in water these reduction processes are characterized by low yields and by long and troublesome manipulations. During such reduction processes, side reactions occur which result in the production of considerable quantities of organic by-products of an insoluble nature, and these, together with large amounts of metal oxides or other inorganic sludges which result from the reducing agents used, precipitate and become intermingled with the required amino compounds. As a result special methods, which are quite tedious and costly, must be employed in order to isolate pure 4,4'-diaminodiphenylamine from the impurities associated therewith.

It is the object of the present invention to overcome the disadvantages of the prior processes by providing a method for the preparation of a diaminodiphenylamine compound by the desulphonation of a diaminodiphenylamine sulphonic acid compound of the type to be hereinafter described.

I have found that the desulphonation of diaminodiphenylamine sulphonic acid compounds which, in the form of the free sulphonic acids, correspond with the general structural formula:

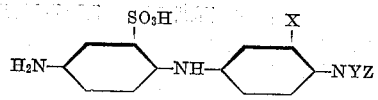

can be effected by subjecting said compounds to hydrolysis with the aid of a non-oxidizing mineral acid, preferably under the conditions of temperature and concentration which are more fully described hereinafter. In this formula X represents a hydrogen atom, an alkyl group (f. i., $CH_3$, $C_2H_5$, $C_3H_7$, etc.), an alkoxy group (f. i., $OCH_3$, $OC_2H_5$, $OC_3H_7$, etc.) or a halogen atom (f. i., Cl or Br), Y represents a hydrogen atom or an alkyl group (f. i., one of the foregoing) and Z represents a hydrogen atom or an alkyl group which may be the same as that represented by Y or different.

In carrying out the process of this invention I proceed in accordance with the following example, it being understood, however, that it is not intended to limit the scope of the invention thereto.

*Example:*—277 parts by weight of 4,4'-diaminodiphenylamine-2-sulphonic acid are suspended in about 1110 parts by weight of about 76% sulphuric acid. The fluid slurry which is thus formed is heated, with constant agitation, to a temperature of about 100° to about 110° C. and held at this temperature for about 1½ hours or until the desulphonation is complete. At the completion of the desulphonation, the slurry is diluted with water, cooled to a temperature of about 20° C. to about 30° C. and filtered. The filtrate is discarded and the residue is washed with cold water until the water becomes faintly acid after passing through the residue. The washed faintly acid precipitate is then suspended in cold water and the aqueous slurry is vigorously agitated. A dilute solution of soda ash or similar alkali is then added to this agitated slurry until it is faintly alkaline. The alkaline mass is filtered, the filtrate discarded, and the residue which consists of precipitated 4,4'-diaminodiphenylamine is washed with cold water until the water passing through the residue is quite free of alkali. The washed precipitate is then dried in a suitable manner.

In order to determine when the desulphonation reaction above described is completed, a few drops of the slurry are diluted with about 20 cc. of hot water and the mixture is made slightly alkaline with ammonia. The solution is filtered, cooled and made acid with dilute sulphuric or hydrochloric acid. The presence of any diaminodiphenylamine-2-sulphonic acid in the sample is evidenced by the formation of a precipitate. Complete desulphonation is indicated by the absence of any precipitate, or by the formation of an extremely small quantity of precipitate.

It will be understood that this invention is not limited to the details given in the above example but that changes may be made without departing from the scope thereof.

Thus, aqueous sulphuric acid of other concentrations may be employed and the temperature at which the hydrolysis is carried out and its duration may be varied. These factors are interrelated, a higher temperature and/or a more extended reaction period being employed with a more dilute sulphuric acid. The use of highly concentrated sulphuric acid is not desirable in view of its tendency to cause sulphonation, particularly at the higher temperatures. For example, satisfactory results may be obtained by the utilization of sulphuric acid ranging in concentration from about 60% to about 80% and at temperatures ranging from about 60° to about 130° C.

The hydrolysis may also be carried out with the aid of other non-oxidizing mineral acids, as for example, hydrochloric acid, but the use of sulphuric acid is preferred.

Furthermore, the hereindescribed hydrolysis treatment may be employed for the desulphonation of other diamino-diphenylamine sulphonic acid compounds (i. e., 4,4'-diamino-3'-methyl-diphenylamine-2-sulphonic acid, 4,4'-diamino-3'-chloro-diphenylamine-2-sulphonic acid, 4,4'-diamino-3'-bromo-diphenylamine-2-sulphonic acid, 4,4'-diamino-3'-methoxy-diphenylamine-2-sulfonic acid, 4,4'-diamino-3'-ethoxy-diphenylamine-2-sulphonic acid, 4-amino-4'-methylamino-diphenylamine-2-sulphonic acid, 4-amino-4'-ethylamino-diphenylamine-2-sulphonic acid, 4-amino-4'-propylamino-diphenylamine-2-sulphonic acid, 4-amino-4'-dimethylamino-diphenylamine-2-sulphonic acid, 4-amino-4'-diethylamino-diphenylamine-2-sulphonic acid, 4-amino-4'-dipropylamino-diphenylamine-2-sulphonic acid, etc.) and salts of the diamino-diphenylamine sulphonic acid compounds, and especially their ammonium and alkali metal salts.

I claim:

1. A method for the desulphonation of a 4.4'-diamino-diphenylamine-2-sulphonic acid compound which, in the form of the free sulphonic acid, corresponds with the general structural formula

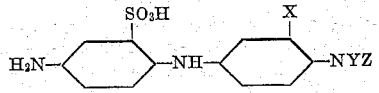

wherein X represents a hydrogen atom, an alkyl group, an alkoxy group or a halogen atom, Y represents a hydrogen atom or an alkyl group, and Z represents a hydrogen atom or an alkyl group, which comprises subjecting the same to hydrolysis in the presence of a non-oxidizing mineral acid.

2. A method for the desulphonation of a 4.4'-diamino-diphenylamine-2-sulphonic acid compound which, in the form of the free sulphonic acid, corresponds with the general structural formula

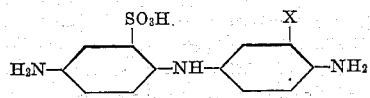

wherein X represents a hydrogen atom, an alkyl group, an alkoxy group or a halogen atom, which comprises treating the same with an aqueous non-oxidizing mineral acid.

3. A method for the desulphonation of a 4.4'-diamino-diphenylamine-2-sulphonic acid compound corresponding with the general structural formula

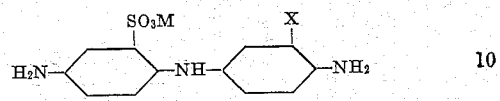

wherein X represents a hydrogen atom, an alkyl group, an alkoxy group or a halogen atom and M represents hydrogen, ammonium or an alkali metal, which comprises treating the same with aqueous sulphuric acid.

4. A method for the desulphonation of a 4.4'-diamino-diphenylamine-2-sulphonic acid compound corresponding with the general structural formula

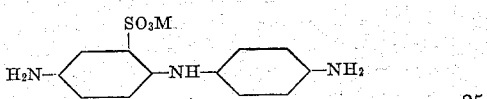

wherein M represents hydrogen, ammonium or an alkali metal, which comprises subjecting it to hydrolysis in the presence of a non-oxidizing mineral acid.

5. A method for the desulphonation of 4.4'-diamino-diphenylamine-2-sulphonic acid which comprises heating it with an aqueous non-oxidizing mineral acid.

6. A method for the desulphonation of 4.4'-diamino-diphenylamine-2-sulphonic acid which comprises heating it with aqueous sulphuric acid.

7. A method for the desulphonation of 4.4'-diamino-diphenylamine-2-sulphonic acid which comprises heating it with sulphuric acid having a concentration from about 60 per cent to about 80 per cent.

8. A method for the desulphonation of 4.4'-diamino-diphenylamine-2-sulphonic acid which comprises heating it with aqueous sulphuric acid at a temperature of from about 60° to about 130° C.

9. A method for the desulphonation of 4.4'-diamino-diphenylamine-2-sulphonic acid which comprises heating it at a temperature of from about 60° to about 130° C. with a solution of sulphuric acid having a concentration of from about 60 per cent to about 80 per cent.

10. A method for the desulphonation of 4.4'-diamino-diphenylamine-2-sulphonic acid which comprises heating it at a temperature of from about 100° to about 110° C. with a solution of sulphuric acid having a concentration of from about 60 per cent to about 80 per cent.

11. A method for the desulphonation of 4.4'-diamino-diphenylamine-2-sulphonic acid which comprises treating said compound at a temperature of from about 100° C. to about 110° C. with a solution of sulphuric acid having a concentration of about 76 per cent.

LUTHER M. LAUER.